United States Patent
Hori et al.

(10) Patent No.: US 7,308,271 B2
(45) Date of Patent: Dec. 11, 2007

(54) MOBILE COMMUNICATION CONTROL METHOD AND RADIO NETWORK CONTROLLER

(75) Inventors: Yosuke Hori, Yokohama (JP); Yasushi Yano, Yokohama (JP)

(73) Assignee: Fujitsu Limited, Kawasaki (JP)

(*) Notice: Subject to any disclaimer, the term of this patent is extended or adjusted under 35 U.S.C. 154(b) by 72 days.

(21) Appl. No.: 10/922,190

(22) Filed: Aug. 19, 2004

(65) Prior Publication Data

US 2005/0208948 A1 Sep. 22, 2005

(30) Foreign Application Priority Data

Mar. 18, 2004 (JP) ............... 2004-078360

(51) Int. Cl.
*H04Q 7/20* (2006.01)

(52) U.S. Cl. ............ 455/452.1; 455/414; 455/416; 455/450; 455/426

(58) Field of Classification Search ........ 455/416, 455/426, 414, 450, 452.1; 320/352
See application file for complete search history.

(56) References Cited

U.S. PATENT DOCUMENTS 5,862,485 A * 1/1999 Linneweh et al. .......... 455/450
6,393,274 B1 * 5/2002 Peltonen ................. 455/414.1
6,904,026 B1 * 6/2005 Tarnanen et al. .......... 370/329
2002/0025801 A1 * 2/2002 Yang ...................... 455/416
2003/0169725 A1 * 9/2003 Ahmavaara et al. ....... 370/352
2003/0190888 A1 * 10/2003 Mangal et al. ........... 455/3.05
2004/0081160 A1 * 4/2004 Rousseau ............... 370/395.2
2004/0102204 A1 * 5/2004 Bar-On .................. 455/517
2005/0250505 A1 * 11/2005 Rasanen ................. 455/450

FOREIGN PATENT DOCUMENTS

| JP | 2000-217157 | 8/2000 |
|----|-------------|--------|
| JP | 2003-61129  | 2/2003 |
| JP | 2003-115849 | 4/2003 |
| WO | WO 01/15406 | 3/2001 |
| WO | WO 01/28160 | 4/2001 |

OTHER PUBLICATIONS

European Search Report dated Jun. 20, 2005.

* cited by examiner

*Primary Examiner*—David Q. Nguyen
(74) *Attorney, Agent, or Firm*—Katten Muchin Rosenman LLP

(57) ABSTRACT

A resource seizure failure and a delay time in resource seizure are prevented from occurring when a packet transmit request is made, during a connected voice call, from a mobile station to which a multicall service is provided. When setting up a CS call, a resource for a PS call is reserved. When a PS call request is made by the user, the PS call is set up by using the reserved resource.

12 Claims, 10 Drawing Sheets

MOBILE COMMUNICATION CONTROL METHOD AND RADIO NETWORK CONTROLLER

BACKGROUND OF THE INVENTION

1. Field of the Invention

The present invention relates to a mobile communication control method, and a radio network controller, for use in a mobile radio network providing a multicall service.

2. Description of the Related Art

W-CDMA (Wideband Code Division Multiple Access) is one of the communication schemes defined in IMT-2000, the international standard for third generation mobile telephone systems.

As shown in FIG. 1, a W-CDMA mobile network comprises mobile stations (MSs), radio base stations (NodeBs), radio network controllers (RNCs), and a mobile switching center (circuit switched: MSC, packet switched: SGSN).

As a third generation mobile communication system, W-CDMA not only supports traditional voice communication services, but also provides multimedia mobile communication services, plus global roaming services that enable customers to use their mobile stations (mobile telephones) in various parts of the world. Further, "multicall" that enables packet data transmission to be performed concurrently with voice communication, which has not been feasible with PDC (Personal Digital Cellular), is also supported with this service, it becomes possible, for example, to transmit graphs or diagrams for presentation purposes while carrying on business negotiations over a voice communication link. In this case, a plurality of codes (radio resources) are allocated to the mobile station, so that the voice data and information data, each spread by a corresponding one of the plurality of codes, can be transmitted and received using the same frequency.

FIG. 2 shows the configuration of a radio network controller (RNC). In FIG. 2, a call processing section 10 controls a plurality of radio base stations (NodeBs) via a NodeB interface section 12 and a CN interface section 14, and performs incoming/outgoing call connection control, call termination control, and diversity handover control such as the selecting and combining of signals arriving from the same mobile station via a plurality of NodeBs and the distribution of replicas to the plurality of NodeBs; in addition, the call processing section 10 incorporates the function of a resource usage managing section 18 which, when performing incoming/outgoing call connection control, for example, seizes necessary radio resources between the RNC and the NodeBs by referring to a resource database section 16.

As described above, in the implementation of multicall in the prior known mobile communication system, if a new packet call connection is to be set up during a voice communication call, a procedure becomes necessary for the radio network controller (RNC) to seize a new radio resource for the packet call and to set up a radio bearer. This procedure involves adding a PS (Packet Switched) service to the call to which a CS (Circuit Switched) service is being provided, but this can cause the following problems.

1) In the prior art, there is a need to seize a new radio resource when setting up a packet communication call but, during this process, a radio resource seizure error or a link connection error may occur.

2) When adding a packet communication connection to a voice communication connection already established, a finite time is required for processing such as the resource seizure for the PS call, and this can affect the PS call connection which is more time critical.

The effects of these problems will be described by taking an example. Suppose, for example, that, when a customer is communicating by voice with a call center of a mail-order house, the customer requests the call center to transmit image data as he desires to view the details of merchandize; in this case, at the present state of technology, a radio resource seizure error may occur during the PS call setup, resulting in unsuccessful data communication or an inability to transmit more time-critical data because of the time required for connection of a data communication channel, and thus missing a business opportunity. A failure in data communication or a delay in communication time can cause a serious problem in such cases as stock dealing in which prices can greatly vary as the time elapses.

Depending on the functions of the mobile station (MS), the PS connection can be established simultaneously with the CS connection, but this involves the problem that resources from the RNC to the core network (CN), where seizure errors are less likely to occur, are needlessly seized.

SUMMARY OF THE INVENTION

Accordingly, it is an object of the present invention to provide a mobile communication control that can prevent a resource seizure error and a delay time in resource seizure from occurring when a packet transmit request is made, during a CS connected call, from a mobile station to which a multicall service is provided.

According to the present invention, there is provided a mobile communication control method comprising the steps of: setting up a link between a radio base station and a core network in response to a request from a mobile station; reserving a resource for packet communication between the radio base station and a radio network controller when setting up the link; and initiating the packet communication upon request from the mobile station by using the reserved resource.

According to the present invention, as a radio resource between the radio base station and the radio network controller, which will become necessary when setting up a packet call during a voice communication, is secured in advance, when a packet connection request is made the connection can be established in a more reliable manner thus reducing the time required to set up the connection and achieving an instantaneous connection. In particular, as a resource in a radio link section, where a shortage of resource is most likely to occur, is reserved in advance, the invention offers the effect of eliminating the possibility of a setup failure when adding a packet connection.

DESCRIPTION OF THE PREFERRED EMBODIMENTS

Figure 1:
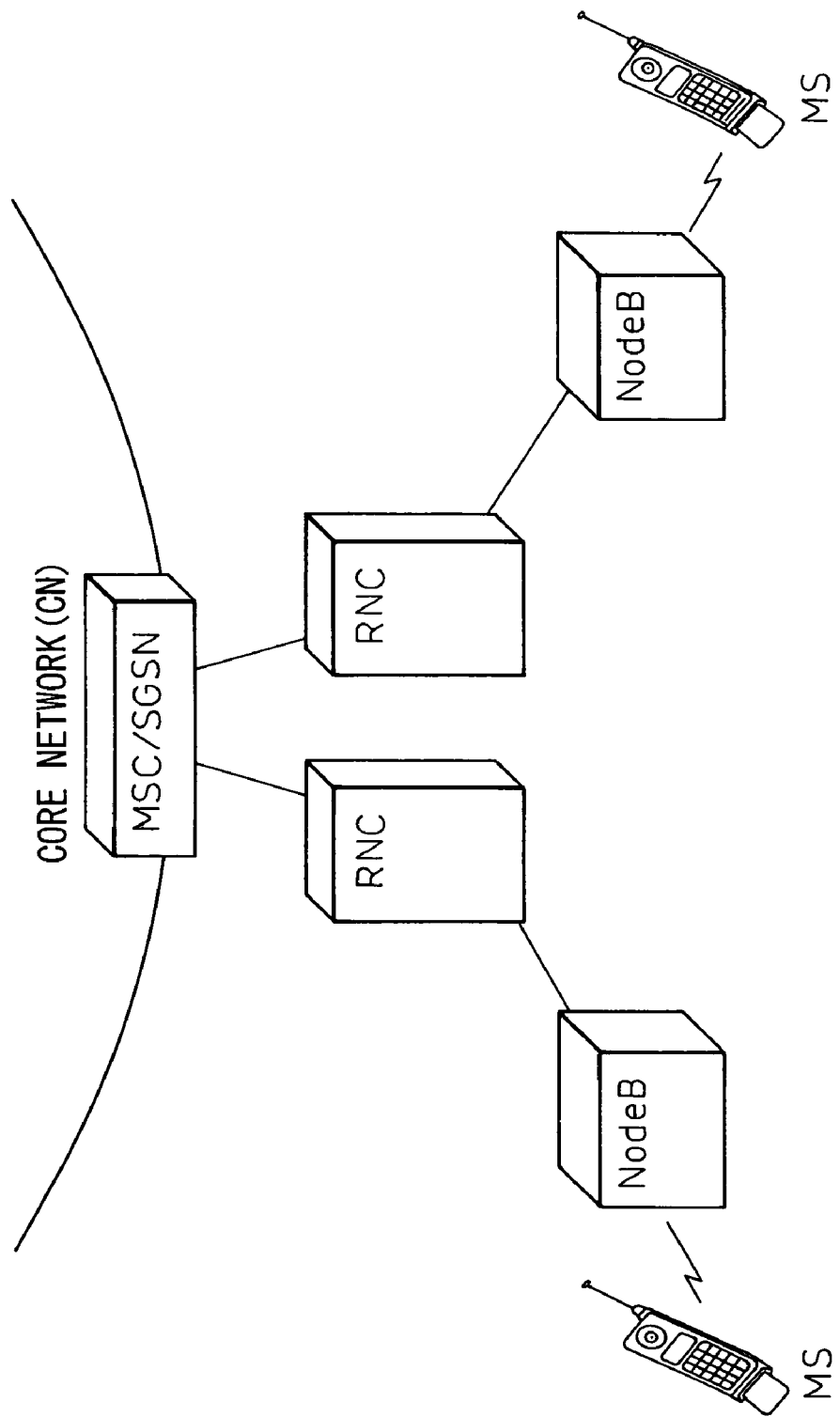
FIG. 1 is a diagram showing the configuration of a W-CDMA mobile network.
Figure 2:
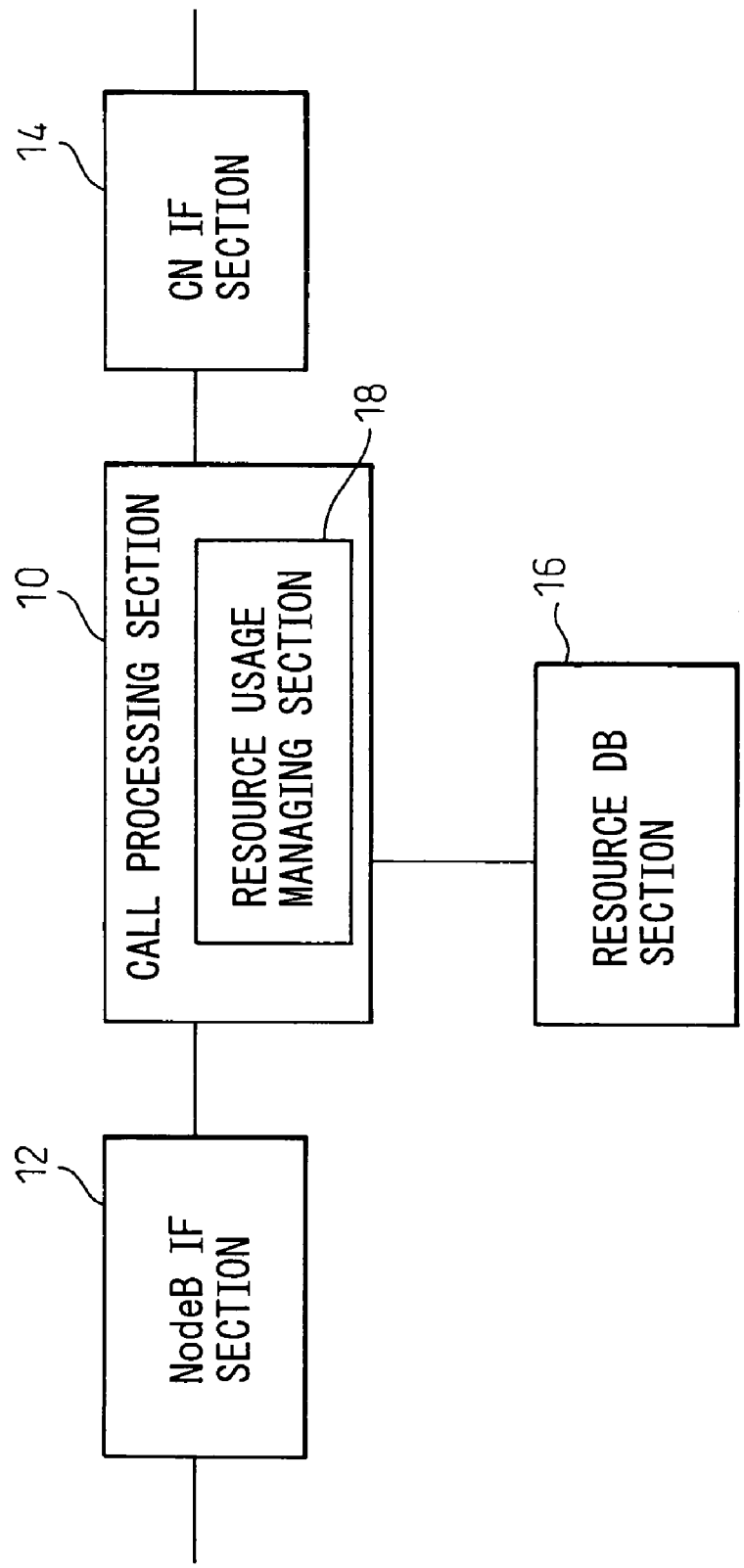
FIG. 2 is a block diagram showing the configuration of a prior art radio network controller.
Figure 3:
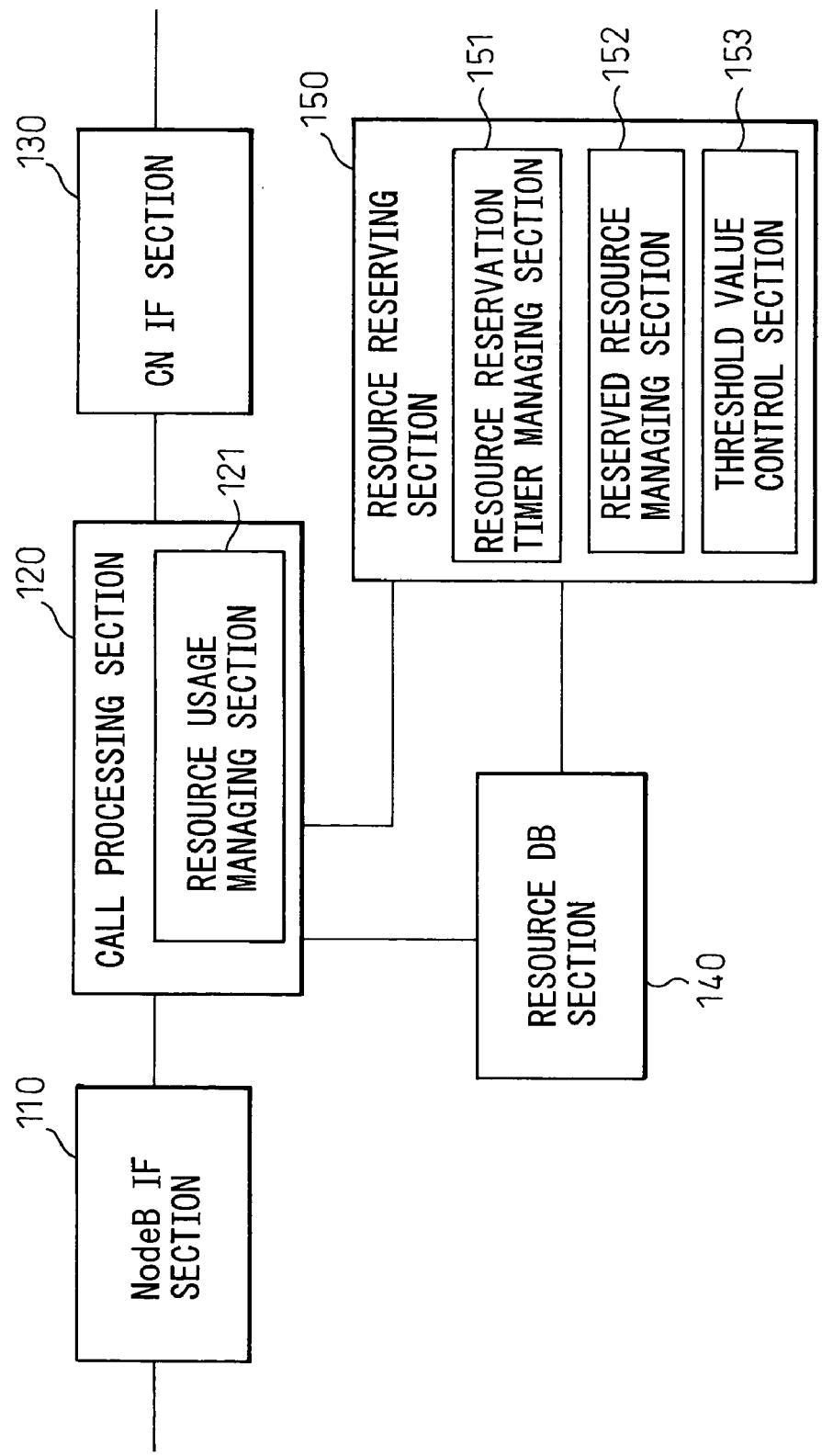
FIG. 3 is a block diagram showing the configuration of a radio network controller according to one embodiment of the present invention.

FIG. 3 shows the configuration of a radio network controller according to one embodiment of the present invention. In FIG. 3, a NodeB IF section 110 transmits and receives messages to and from radio base stations (NodeBs), and notifies each section accordingly. A call processing section 120, which incorporates a resource usage managing section 121, performs call connection control and sets up a link by making a radio resource seizure request to a resource DB section 140. During a voice call connection, the call processing section 120 sends a request to a resource reserving section 150 to reserve a radio resource for a packet call. The resource usage managing section 121 manages the user of each radio resource currently in use and the reservation number of each radio resource reserved for a PS call.

A CN IF section 130 transmits and receives messages to and from a core network (CN). The resource DB section 140 stores the radio resource that each use uses between the radio network controller (RNC) and the radio base station (NodeB). Each NodeB comprises a plurality of cells, and resources are managed for each cell in the NodeB.

The resource reserving section 150 is a newly added section according to the present invention, and comprises a resource reservation timer managing section 151, a reserved resource managing section 152, and a threshold value control section 153. When a reservation request for a packet call radio resource is received from the call processing section 120, the resource reserving section 150 instructs the threshold value control section 153 to check the threshold value for the resources available for use. If the threshold value is not exceeded, a reservation is made to the resource DB section 140 for a radio resource for a packet call connection. After reserving the radio resource, a timer start request is issued to the resource reservation timer managing section 151. When the timer in the resource reservation timer managing section 151 times out, the reserved radio resource is freed. The resource reservation timer managing section 151 receives the timer start request from the resource reserving section 150 and manages the time elapsed from the radio resource reservation. When the elapsed time reaches a predetermined time, a timeout notification is sent to the reserved resource managing section 152 as well as to the call processing section 120.

The reserved resource managing section 152 manages the reserving user, reservation number, timer ID, etc. for the radio resource reserved for the packet call.

The threshold value control section 153 manages the amount of packet call radio resources available for reservation in terms of a threshold value, and compares the usage state of the radio resources in the resource DB section 140 with the threshold value.

Each functional block of the RNC, except the NodeB IF section 110 and the CN IF section 130, can be implemented in software.

Figure 4:
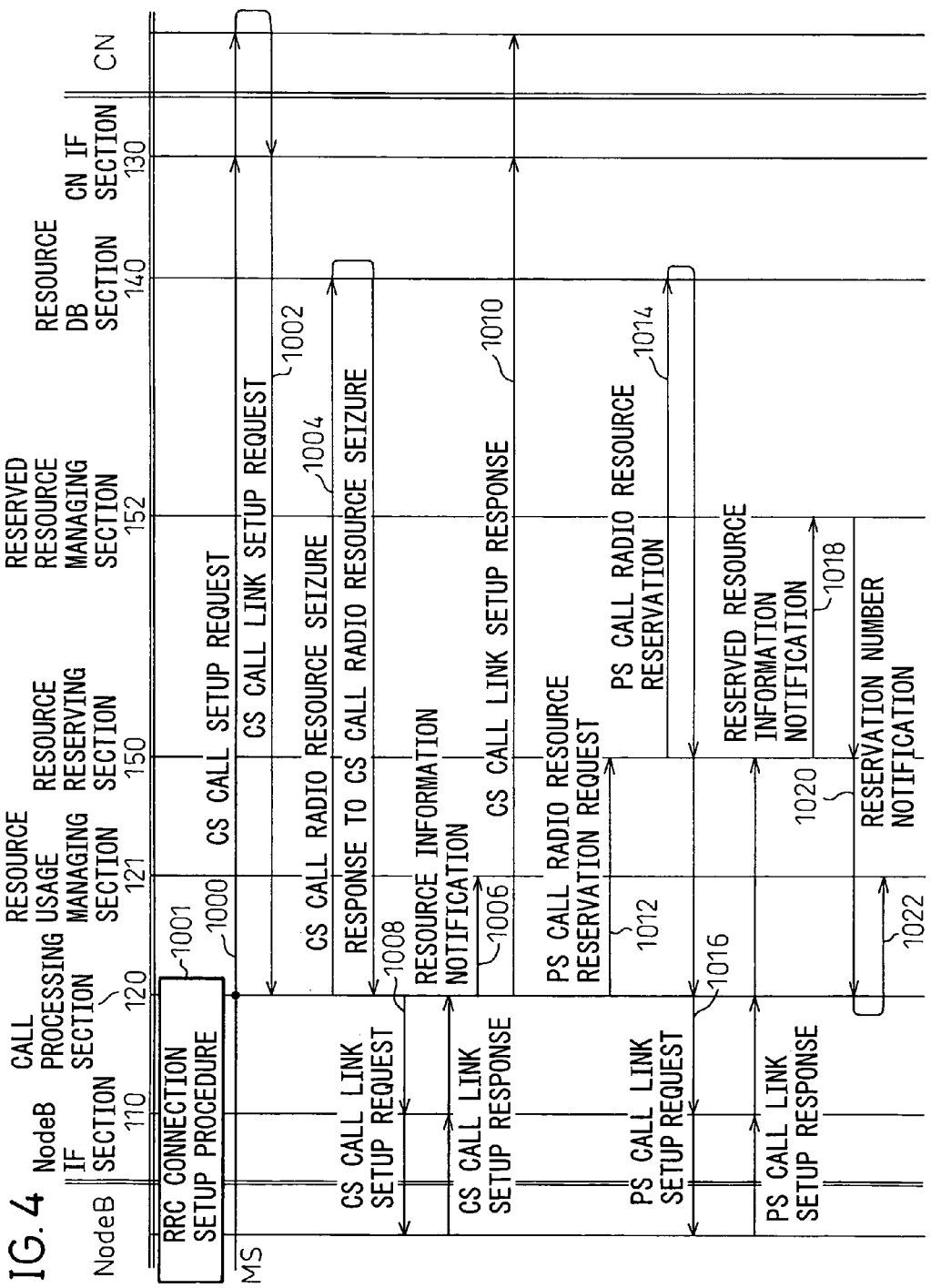
FIG. 4 is a sequence diagram showing a procedure for CS call setup and PS call resource reservation.

FIG. 4 shows one example of a procedure for a CS call setup and its attendant PS call resource reservation.

In FIG. 4, after an RRC (Radio Resource Control) connection setup procedure is carried out (step 1001), when a CS call is initiated by a mobile station (MS) of a user M1, or when an incoming call to the MS is answered by the MS, a CS call link setup request is sent to the core network (CN) via the call processing section 120 of the RNC (step 1000). After authenticating the user, the CN responds by sending a CS call link setup request to the RNC (step 1002). The call processing section 120 seizes a CS call radio resource (R1) from among the radio resources available for use (Table 1) held in the resource DB section 140 (step 1004), and sends the thus seized radio resource information and user information as a resource information notification to the resource usage management section 121 (step 1006). The call processing section 120 sends a CS call link setup request to the NodeB (step 1008) by using the seized resource (R1) and, after the link connection is established between the NodeB and the RNC, a CS call link setup response is sent to the CN IF section (step 1010) which thus sets up the CS connection to the CN. The settings in the resource usage management section 121 at this time are: user=M2, reservation number=0 (initial value), and resource in use=R1 (Table 2)

TABLE 1

| Radio Resources Available for Use | | | | |
|---|---|---|---|---|
| R1 | R6 | . | . | . |
| R2 | R7 | . | . | . |
| R3 | R8 | . | R50 | . |
| R4 | R9 | . | R51 | |
| R5 | R10 | R20 | | R100 |

TABLE 2

| User (Mobile Station) | Radio Resource Reservation No. | Resource in Use |
|---|---|---|
| M1 | 0 | R1 |

In addition to the traditional voice connection procedure described above, the RNC of the present invention performs the PS call resource reservation procedure hereinafter described.

After sending the resource information notification to the resource usage management section 121 (step 1006), the call processing section 120 makes a request to the resource reserving section 150 for the reservation of a PS call radio resource (step 1012). The resource reserving section 150 that received the PS call radio resource reservation request seizes a radio resource (R2) for a PS connection from among the radio resources available for use (Table 1) held in the resource DB section 140 (step 1014), and sends a PS call link setup request to the NodeB IF section 110 (step 1016). In the event of a failure of the PS call link setup request, the PS call link setup request is retransmitted to the NodeB IF section 110 in an endless retry process to set up a PS call link to the NodeB. The resource reserving section 150 notifies the reserved resource managing section 152 of the reserved radio resource (R2) (step 1018), to which a resource reservation number (1) is assigned. The settings in the reserved resource managing section 152 at this time are: resource reservation number=1 and reserved resource=R2 (Table 3). The reserved resource managing section 152 that received the reserved resource information notification sends the reservation number to the call processing section 120 to notify it of the newly made reservation (step 1020), and the call processing section 120 stores the reservation number (1) in the resource usage managing section 121 (step 1022). The settings in the resource usage managing section 121 at this time are: user=M1, reservation number=1, and resource in use=R1 (Table 4).

TABLE 3

| Resource Reservation Number | User (Mobile Station) | Reserved Resource |
|---|---|---|
| 1 | M1 | R2 |

TABLE 4

| User (Mobile Station) | Radio Resource Reservation No. | Resource in Use |
|---|---|---|
| M1 | 1 | R1 |

Figure 5:
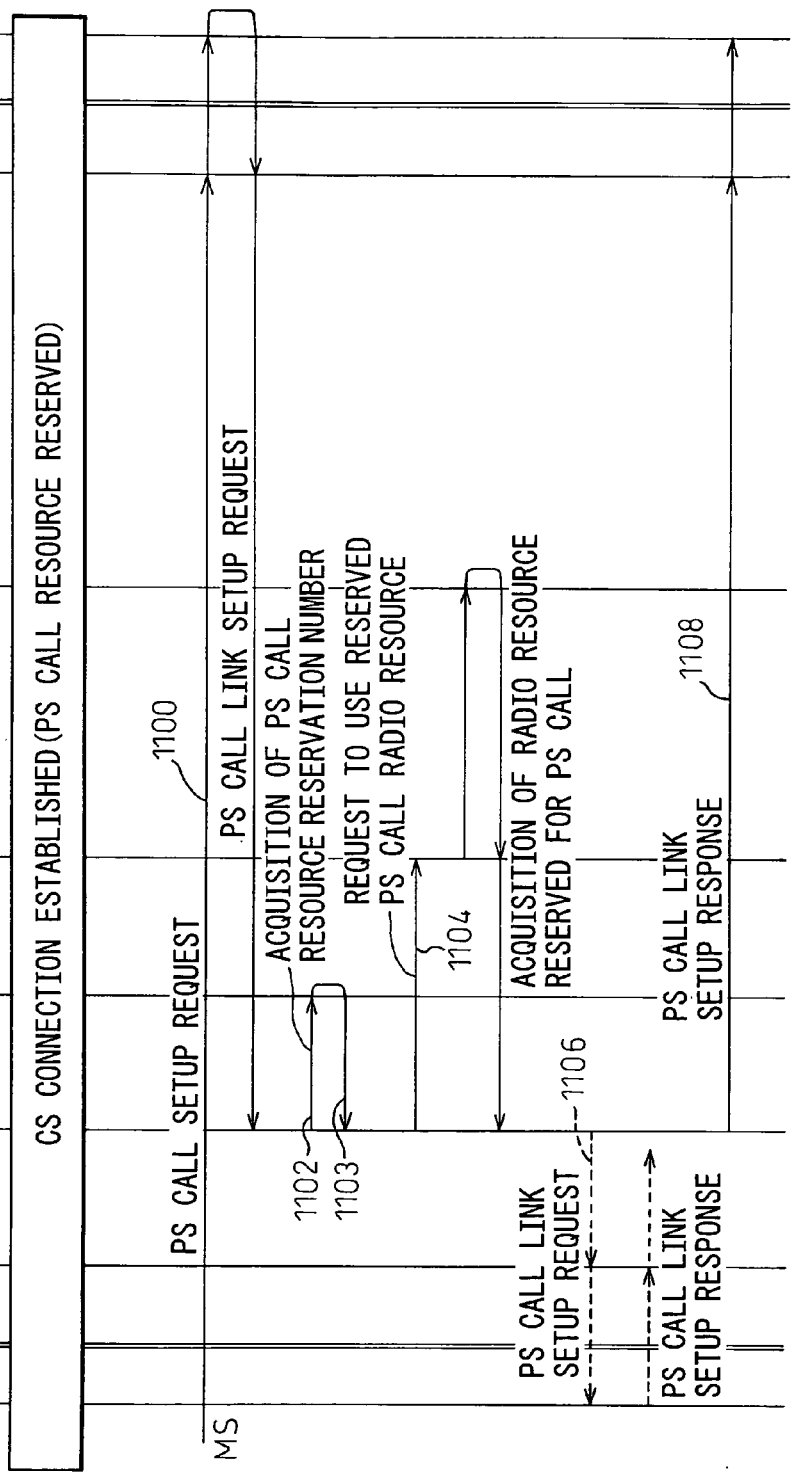
FIG. 5 is a sequence diagram showing a PS call setup procedure when a PS call resource is reserved.

FIG. 5 shows a sequence for the case where the user M1 makes a PS connection request (for example, an image transfer request) when the resource R1 is in use for voice communication and the resource R2 for packet communication is reserved for the user M1, as shown in Tables 3 and 4.

The call processing section 120 that received the PS call link setup request checks the resource usage management section 121 to examine the resource usage state (step 1102). As the PS radio resource (R2) is reserved, the call processing section 120 acquires the resource reservation number (1) from the resource usage management section 121 (step 1103), and sends the resource reservation number (1) to the resource reserving section 150 together with a request to use the reserved PS call radio resource (step 1104). Based on the resource reservation number (1), the resource reserving section 150 acquires the reserved radio resource (R2) from the reserved resource managing section 152. The call processing section 120 that received a response from the resource reserving section 150 to the request to use the reserved PS call radio resource sends a PS call link setup response to the CN IF section 130 (step 1108) by skipping the step (step 1106) of setting up a link between the NodeB and the RNC (already set up in step 1016 of FIG. 4). In this way, the image transfer (PS connection) can be accomplished in a short time without concern regarding a seizure error.

As described above, the user (mobile station MS) can efficiently perform the operation (multicall) for transferring an image during voice communication.

Figure 6:
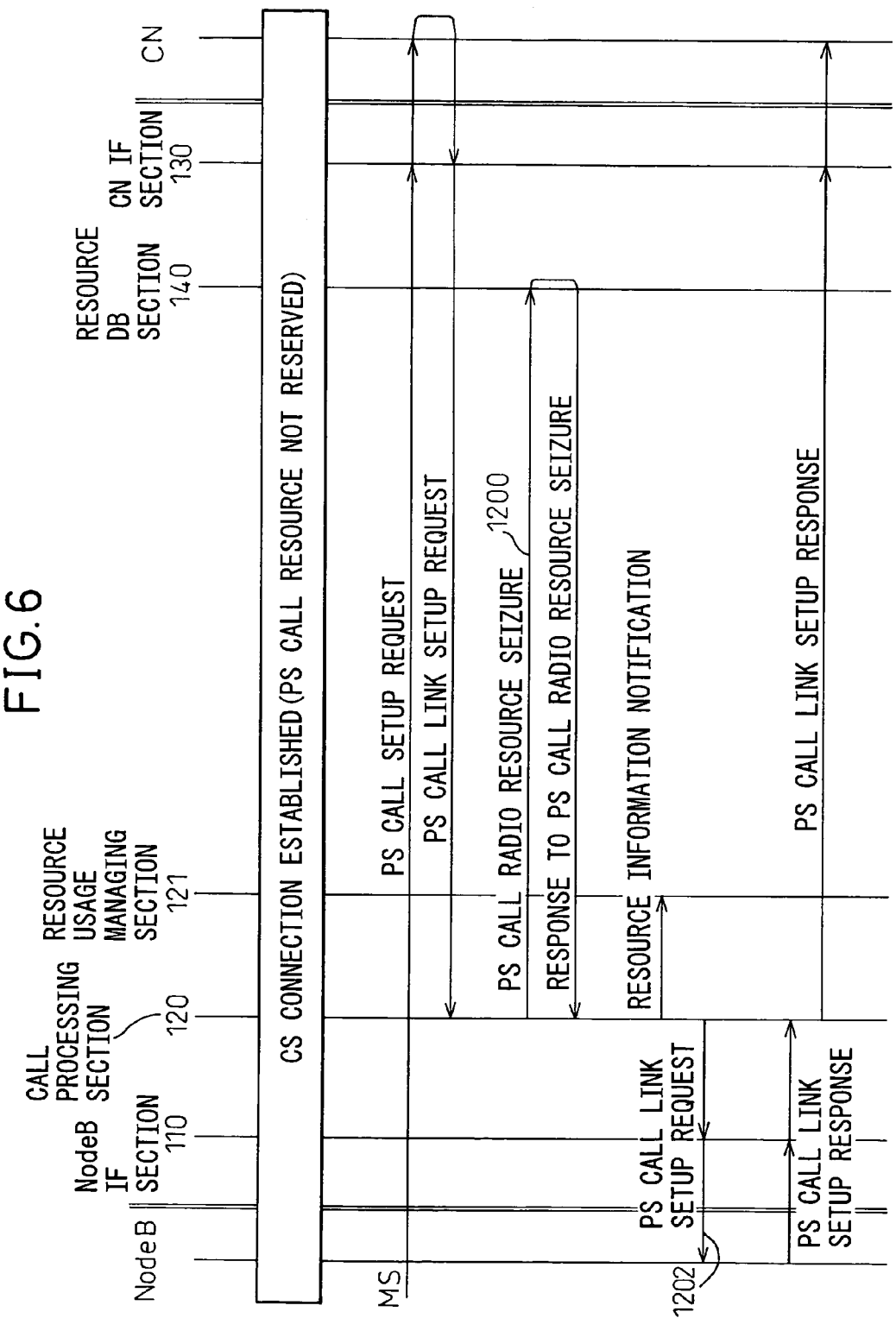
FIG. 6 is a sequence diagram showing a PS call setup procedure when a PS call resource is not reserved.

FIG. 6 shows a sequence for the case where a PS call setup request has occurred when the PS call resource is not reserved as in the prior art or for reasons to be described later, or after the reserved resource has been freed for reasons to be described later. Unlike the case of FIG. 5, this sequence requires the step for the call processing section 120 to seize a PS call radio resource from the resource DB section 140 (step 1200) and the step of setting up a PS call link with the NodeB (step 1202). This not only causes a delay in responding to the multicall request made by the user, but may also result in a failure of resource seizure.

Figure 7:
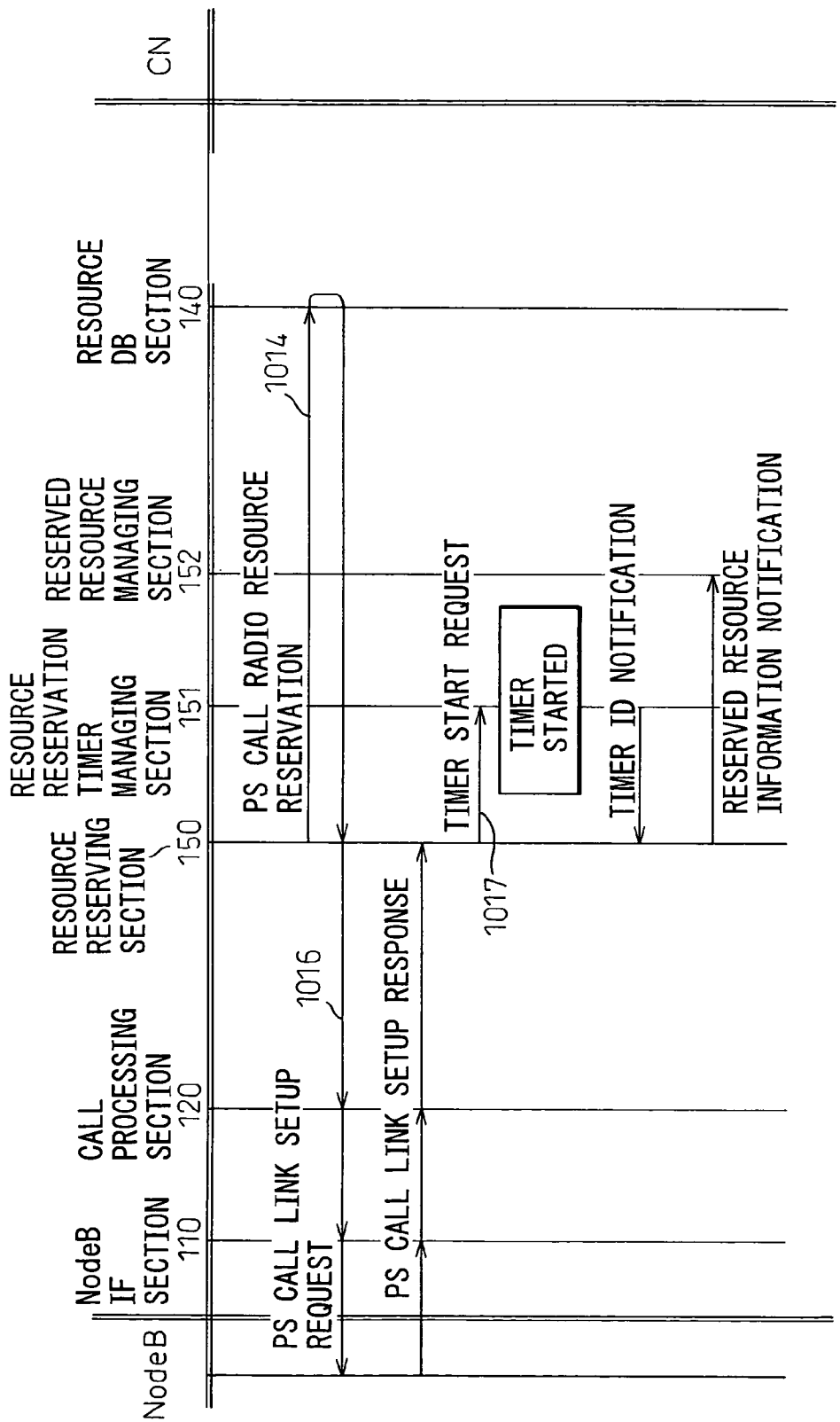
FIG. 7 is a sequence diagram showing a procedure for setting a timer when reserving a PS call resource.

FIG. 7 shows, as a modification of the sequence shown in FIG. 4, an example in which the resource reserving section 150 issues a timer start request to the resource reservation timer managing section 151 (step 1017) after making a PS call radio resource reservation to the resource DB section 140 (step 1014) and after setting up a PS call link with the NodeB (step 1016). As a result, time ID "AAA" is set in the reserved resource managing section 152 as shown in Table 5.

TABLE 5

| Resource Reservation No. | User (Mobile Station) | Timer ID | Reserved Resource |
|---|---|---|---|
| 1 | M1 | AAA | R2 |

Figure 8:
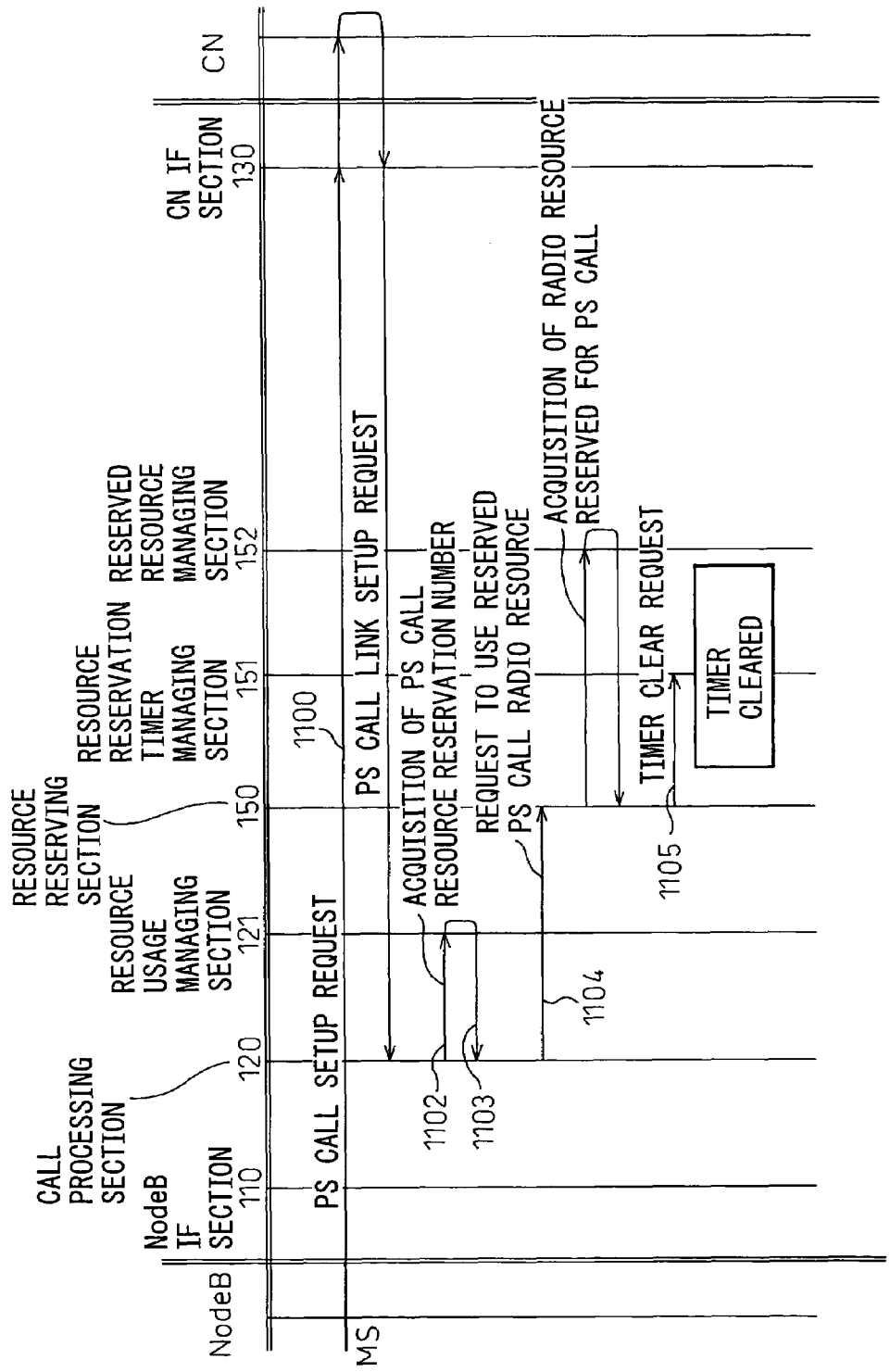
FIG. 8 is a sequence diagram showing a procedure for clearing the timer when setting up a PS call in response to a user request.

In this case, in the PS call link setup procedure of FIG. 5 (steps starting from 1100), the resource reserving section 150 issues a timer clear request as shown in FIG. 8 (step 1105).

Figure 9:
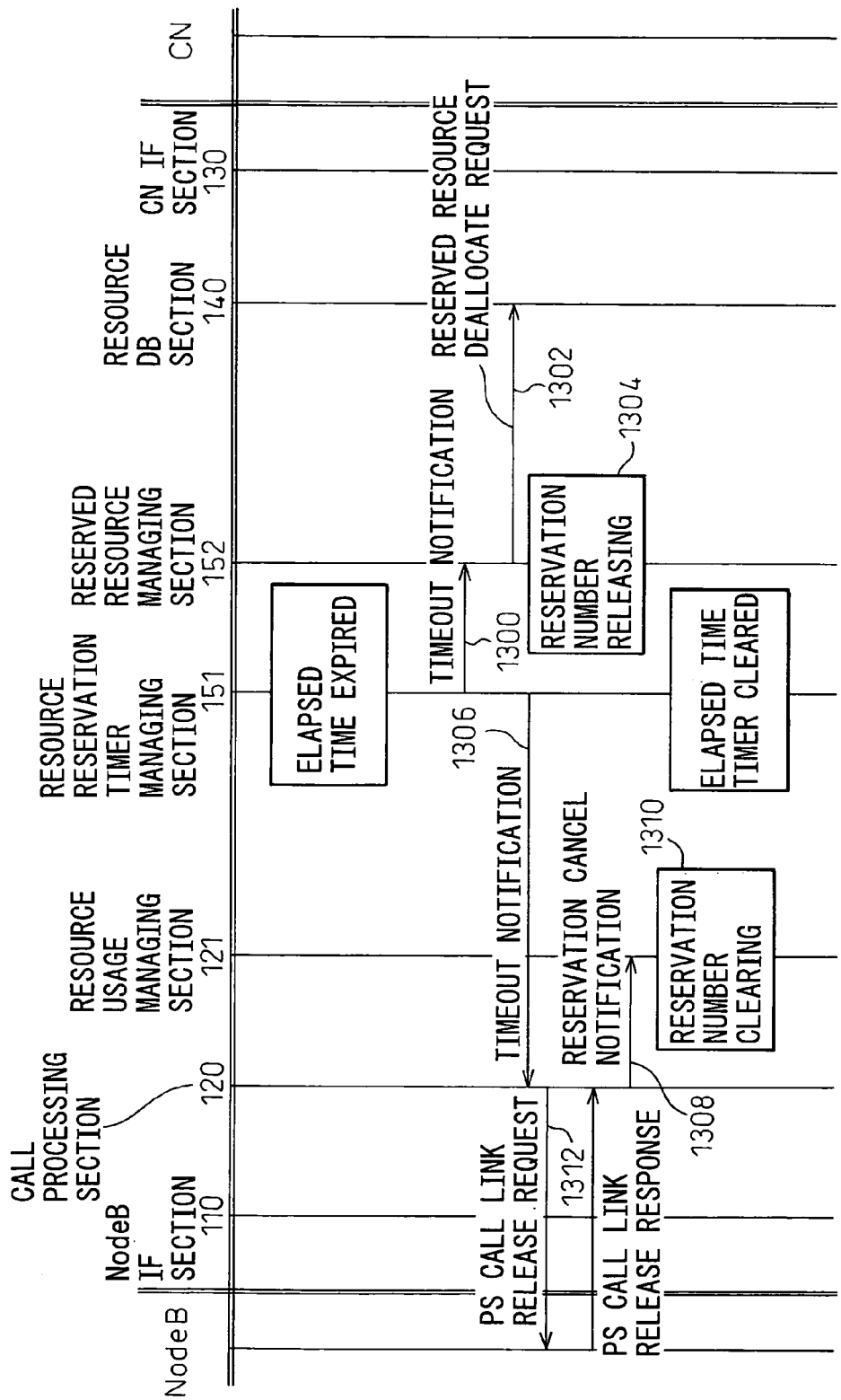
FIG. 9 is a sequence diagram showing a procedure for canceling the reservation when a PS call request is not made before the timer times out.

As shown in FIG. 9, if packet communication, i.e., multicall, is not requested by the user M1 (mobile station MS) within five minutes (timeout interval), the timer (timer ID=AAA) set in the resource reservation timer managing section 151 for the resource (R2) times out, and the timer is thus cleared based on the timer ID (AAA). At the same time, the resource reservation timer managing section 151 sends a timeout notification (timer ID=AAA) to the reserved resource managing section 152 (step 1300), whereupon the reserved resource managing section 152 sends a radio resource deallocate request to the resource DB section 140 to free the reserved radio resource (R2) (step 1302), and releases the reservation number (1) that it manages (step 1304). The resource reservation timer managing section 151 also sends the timeout notification to the call processing section 120 (step 1306) to cancel the reservation of the user (M1) for whom the resource (R2) was reserved. The call processing section 120 notifies the resource usage managing section 121 of the cancellation of the reservation (step 1308), and clears the reservation number (1) of the user (M1) to the initial value (0) (step 1310). To release the PS call link between the NodeB and the RNC, the call processing section 120 issues a PS call link release request to the NodeB IF section 110 (step 1312) to release the link.

In the response (step 1002) to the CS call setup request (step 1000) in FIG. 4, the call processing section 120 can obtain from the CN the class of service that indicates the priority of the user M1. Here, the class of service of the user (MS) to whom multicall is not offered, for example, is set to the initial value. It is therefore desirable not to reserve a PS call resource during the CS call setup process when the class of service thus obtained is set to the initial value.

Preferably, the class of service obtained for each mobile station is stored in the reserved resource managing section 152 (FIG. 3) as shown in Table 6.

TABLE 6

| Mobile Station | Class of Service Offered |
|---|---|
| M1 | 4 |
| M2 | 5 |
| M3 | 3 |
| M4 | 0 |
| . | . |
| . | . |
| . | . |

0 < Class of Service Offered < 5
0 (Initial value): Indicates mobile station for which reservation is not permitted.

Figure 10:
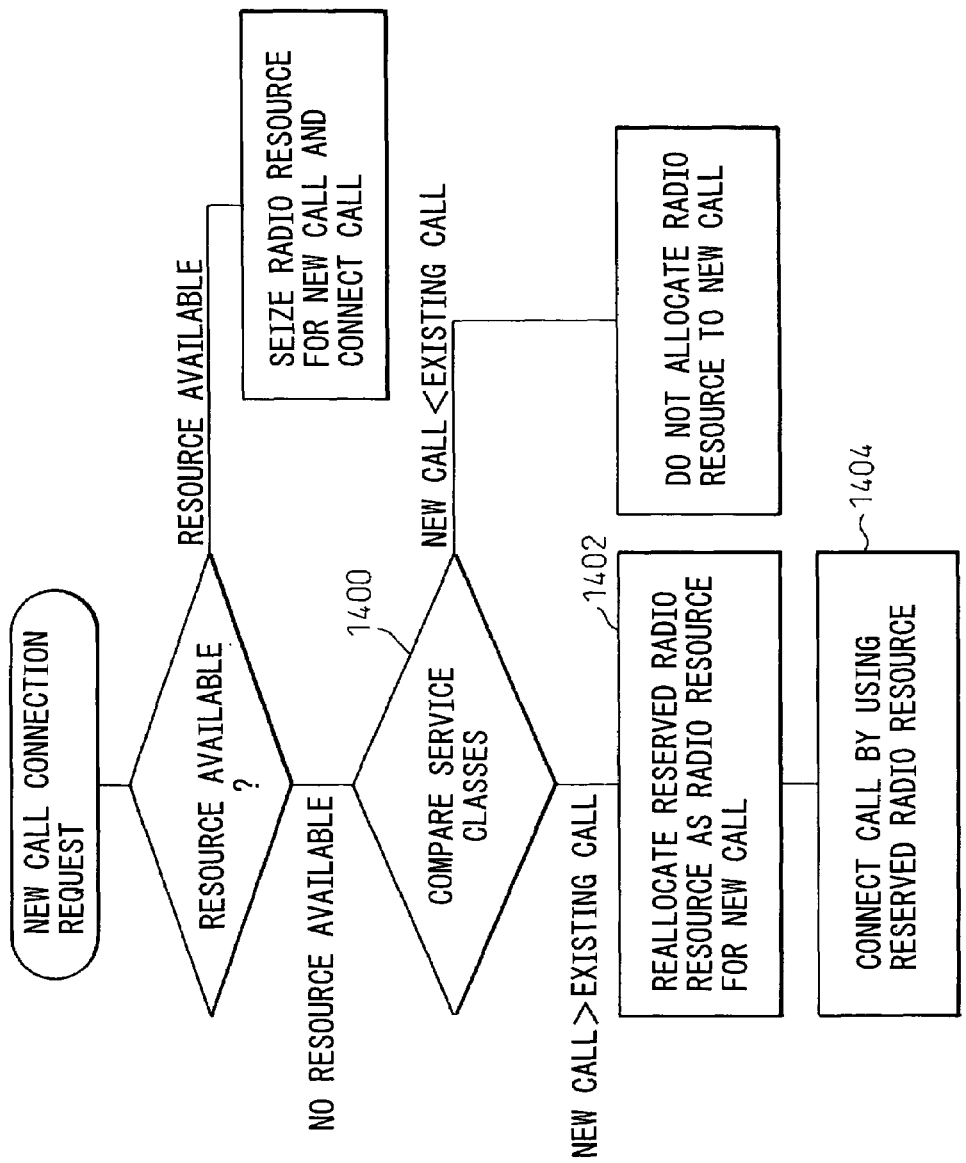
FIG. 10 is a flowchart showing a procedure for accepting a new call when a resource is reserved.

Then, as shown in the flowchart of FIG. 10, when connecting a new call, if all the available resources are in use or reserved, the class of service offered to the new call is compared with that of each MS for which a resource is reserved (step 1400); if there is any resource reserved for an MS whose priority is lower than that of the new call requesting MS, it is desirable to reallocate the reserved resource as the radio resource for the new call and to connect the new call by using the thus reallocated radio resource.

Similarly, when newly reserving a resource, if it is found that the resource is already allocated to a MS whose priority is lower than that of the new call, the reserved resource may be reallocated to the new call.

Further, in the timer setting described with reference to FIG. 7, the timeout interval of the timer may be changed according to the priority defined by the class of service of each user (MS).

Provisions may also be made to set a threshold value (for example, 50) on the number of reserved resources against the total number of resources available for use (for example, 100), and not to perform the resource reservation when the number of resources in use or reserved exceeds the threshold value. This serves to avoid a situation where a new call cannot be accepted because of over-reservation of the radio resources.

If a PS call request occurs during a handover when the MS is connected to more than one NodeB, a failure or delay or the like can occur in seizing the resource for the PS call to be set up with the new NodeB to which the MS is to be handed over. To address this situation, provisions may be made so that when the handover is initiated, the resource for the PS call is reserved simultaneously with the setting up of the CS call with the new NodeB, and so that when the handover is completed releasing the CS call with the old NodeB, the reservation of the corresponding PS call resource is also released. Further, in the above embodiment, the PS call reservation has been performed for every new call connection request, but alternatively, the PS call reservation may be performed only for a new call that satisfies a certain condition, for example, for a new call addressed to a particular destination. This, for example, has the effect of preventing congestion due to reservations. Further, in the above embodiment, the PS call reservation has been performed when setting up a call link, but it is also possible to reserve a link call upon request when setting up a PS call.

The invention claimed is:

1. A mobile communication control method comprising the steps of:
   setting up a first call between a radio base station and a core network using a first radio resource in response to a request from a mobile station;
   reserving a second radio resource for a second call for said mobile station between said radio base station and a radio network controller when setting up said first call; and
   initiating the setting up of said second call upon request for said second call from said mobile station by using said reserved second radio resource.

2. A mobile communication control method according to claim 1, further comprising the step of reserving, during a handover of said first call, a resource necessary for setting up said second call between said radio network controller and a radio base station to which said first call is to be handed over.

3. A mobile communication control method according to claim 1, further comprising the step of measuring a time elapsed from the reservation of said second radio resource, and the step of freeing said reserved second radio resource when said elapsed time has reached a predetermined time.

4. A mobile communication control method according to claim 1, wherein the reservation of said second radio resource is performed only for a mobile station to which a multicall service is provided.

5. A mobile communication control method according to claim 1, further comprising the step of securing a resource for reservation for said mobile station by freeing a resource reserved for some other mobile station whose priority is lower than the priority of the service provided to said reservation requesting mobile station, if there is no other resource available for reservation.

6. A mobile communication control method according to claim 1, wherein when the amount of resources reserved or in use exceeds a predetermined threshold value, the reservation of said resource is not performed.

7. A radio network controller comprising:
   means for selling up a first call between a radio base station and a core network using a first radio resource in response to a request from a mobile station;
   means for reserving a second radio resource for a second call for said mobile station between said radio base station and said radio network controller when selling up said first call; and
   means for initiating the selling up of said second call upon request for said second call from said mobile station by using said reserved second radio resource.

8. A radio network controller according to claim 7, further comprising means for reserving, during a handover of said first call, a resource necessary for selling up said second call between said radio network controller and a radio base station to which said first call is to be handed over.

9. A radio network controller according to claim 7, further comprising means for measuring a time elapsed from the reservation of said second radio resource, and means for freeing said reserved second radio resource when said elapsed time has reached a predetermined time.

10. A radio network controller according to claim 7, wherein the reservation of said second radio resource is performed only for a mobile station to which a multicall service is provided.

11. A radio network controller according to claim 7, further comprising means for securing a resource for reservation for said mobile station by freeing a resource reserved for some other mobile station whose priority is lower than the priority of the service provided to said reservation requesting mobile station, if there is no other resource available for reservation.

12. A radio network controller according to claim 7, wherein when the amount of resources reserved or in use exceeds a predetermined threshold value, the reservation of said resource is not performed.

* * * * *